United States Patent [19]

Oliver et al.

[11] Patent Number: 4,907,404
[45] Date of Patent: Mar. 13, 1990

[54] CUTTING ARRANGEMENT

[76] Inventors: George R. Oliver; Stephen G. Oliver, both of 14 Caxton Place, Te Awamutu, New Zealand

[21] Appl. No.: 236,560

[22] Filed: Aug. 25, 1988

[51] Int. Cl.$^4$ .............................................. A01D 34/84
[52] U.S. Cl. .................................... 56/256; 56/14.7; 172/15; 172/17; 172/273; 172/306; 172/394
[58] Field of Search ................ 56/17.1, 17.2, 256, 56/228, 14.7, DIG. 9; 172/13–17, 240, 244, 294, 303, 306, 394, 452, 536, 578

[56] References Cited

U.S. PATENT DOCUMENTS

| | | | |
|---|---|---|---|
| 1,505,685 | 8/1924 | Allen | 172/14 |
| 1,668,625 | 5/1928 | Boyer et al. | 172/240 |
| 2,739,437 | 3/1956 | True | 172/15 |
| 2,977,740 | 4/1961 | King | 56/256 |
| 3,055,438 | 9/1962 | Wood et al. | 172/15 |
| 3,590,928 | 7/1971 | Mirus | 172/240 |
| 4,200,155 | 4/1980 | Mullet et al. | 56/256 |
| 4,371,039 | 2/1983 | Schaaf et al. | 172/244 |
| 4,629,006 | 12/1986 | Mullet et al. | 56/256 |
| 4,691,784 | 9/1987 | Mullet et al. | 56/256 |

Primary Examiner—Bruce M. Kisliuk
Attorney, Agent, or Firm—Bucknam and Archer

[57] ABSTRACT

A cutting arrangement for grass is releaseably mountable or attachable to a vehicle. For cutting the grass, a rotatable wheel is used. The wheel extends outwardly from one side of the housing and has a cutting disc. The position of the wheel is adjustable.

8 Claims, 8 Drawing Sheets

CUTTING ARRANGEMENT

BACKGROUND TO THE INVENTION

This invention relates to a machine suitable for cutting grass and the like, and more particularly to a machine for cutting grass along the edges of curbs along streets, roads, footpaths and the like.

Many roads and footpaths are provided with substantially L-shaped curbs or channels at the side. Grass and soil are provided on the inner surface of these curbs, and very often grass grows up over the curbs and intrudes onto the road or footpath. This is often unsightly and unattractive, and can also cause problems by obstructing the passageway. Numerous means have been proposed in the past for cutting and trimming such grass and the like, in order to provide a more attractive appearance, and to keep the passageway clear. However, few of the previously known arrangements have been successful. Various problems have been encountered. For example, many of these arrangements are self-contained, in that they do not attach to another vehicle or piece of equipment. This type of arrangement can be relatively expensive, in that engines and the like must also be provided, for a machine which can only perform one function. Other problems are related to the inefficiency of such machinery, which have not cut the grass and other vegetation consistently and cleanly. Other arrangements may be suitable for domestic use, or in situations where only a small amount of grass need be cut. Such arrangements are not suitable for large scale operations, or for commercial use.

It is an object therefore of one aspect of the present invention to provide a cutting arrangement which goes some way towards overcoming, or at least minimizing the abovementioned problems.

BRIEF SUMMARY OF THE PRESENT INVENTION

According to one aspect of the present invention there is provided a cutting arrangement, releasably mountable or attachable to a vehicle or other propulsion means, the cutting arrangement including attachment or mounting means, a housing, guide means and cutting means, the arrangement being such that the mounting or attachment means extends outwardly from a face of the housing, and the cutting means is attached to a side of said housing, with cutting surfaces spaced apart from the housing, and the guide means is located at one side of the housing and is adjustable relative thereto.

According to a further aspect of the present invention there is provided a cutting arrangement releasably mountable or attachable to a vehicle or other propulsion means, the cutting arrangement including a housing, mounting or attachment means extending outwardly from a face thereof and attachable to an axle of a vehicle or other propulsion means, at least one cutting means, each of the cutting means comprising a freely rotatable wheel extending outwardly from one side of the housing, with a cutting disc releasably attachable to an outer end thereof, guide means in the form of a substantially horizontally rotatable wheel extending outwardly from one side of the housing, the position of the guide means being adjustable relative to the housing and the cutting means.

According to a still further aspect of the present invention there is provided a method of cutting vegetation about or adjacent a curb, including attaching to an axle of a tractor or other vehicle a cutting arrangement, the cutting arrangement including attachment or mounting means, a housing, guide means and cutting means, wherein the housing includes the attachment means extending outwardly from a face thereof, the cutting means is attached to a side of the housing with cutting surfaces spaced apart from the housing, the guide means is located at one side of the housing and is adjustable relative to it; thereafter positioning the cutting means adjacent a side of the curb, and positioning the guide means adjacent an opposite side of the curb, and thereafter moving the arrangement relative to said kerb and the vegetation.

BRIEF DESCRIPTION OF THE DRAWINGS

Further aspects of the invention will become apparent from the following description which is given by way of example only, and with reference to the accompanying drawings, in which.

DETAILED DESCRIPTION OF THE PREFERRED EMBODIMENTS OF THE PRESENT INVENTION

Figures 1, 2:
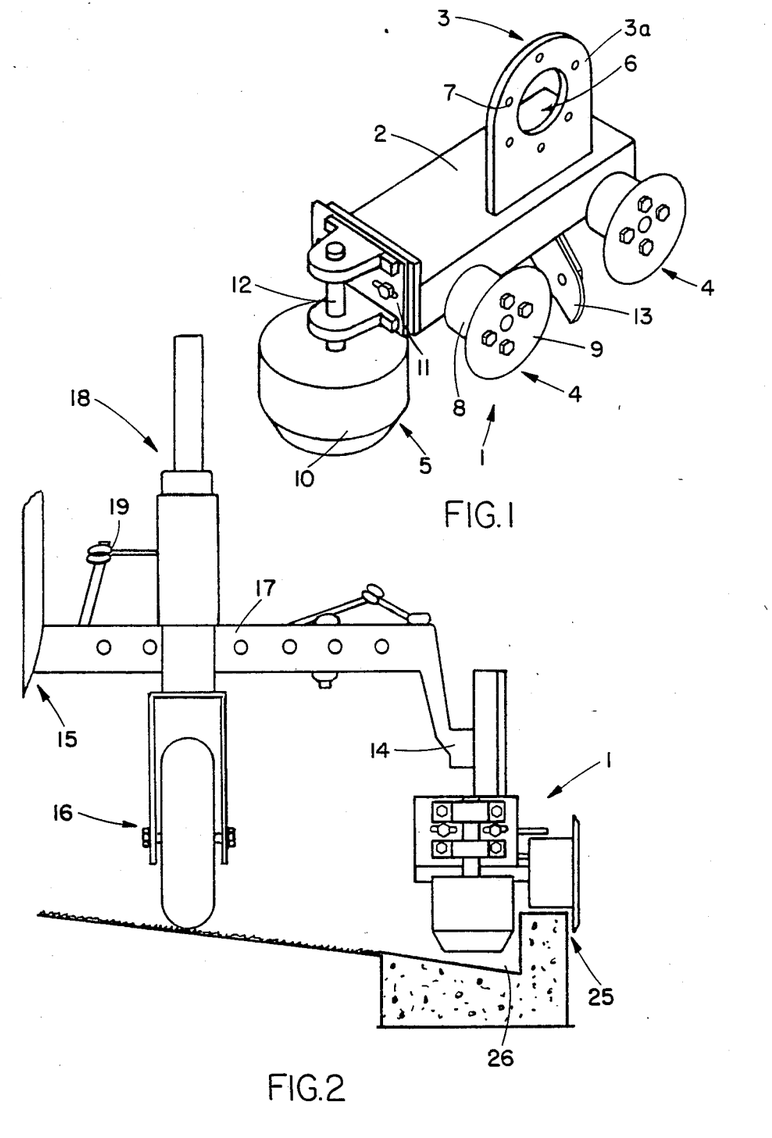
FIG. 1 shows a perspective view of a cutting arrangement according to one aspect of the present invention.
FIG. 2 shows a front view of an arrangement according to one aspect of the invention, including the cutting arrangement as shown in FIG. 1.

Referring firstly to FIG. 1, there is provided in one form of the invention a cutting arrangement 1. The cutting arrangement 1 includes a housing 2, attachment or mounting means 3, cutting means 4 and guide means 5.

The housing 2 is preferably a substantially elongate, substantially rectangular portion. Extending outwardly from an upper surface thereof is an attachment or mounting means in the form of a collar 3a, which is preferably substantially arcuate in shape and which includes a substantially circular bore 6 extending therethrough. There may also be stud holes 7 through which studs on an axle of a tractor or other suitable vehicle may be located, as will be further described hereinafter.

Extending outwardly from one side of the housing 2 is at least one cutting means 4, in the form of a freely rotatable wheel 8 and a substantially circular cutting disc 9 releasably engageable on an outer surface thereof. The cutting disc 9 is also free to rotate. In the preferred form of the invention shown in FIG. 1, there is provided two cutting means 4, spaced apart from one another, and located at opposite ends of the housing 2.

The guide means 5 preferably comprises a horizontally rotatable jockey wheel 10, which may be tapered at the lower end. The wheel 10 is mounted on a mounting plate 11, with the guide means 5 generally being so formed as to allow rotation of the wheel 10 about an axle 12, attached to the mounting plate 11.

The cutting arrangement 1 may also be provided with a scraper blade 13. In the preferred form of the invention shown in FIG. 1 the blade 13 is preferably located between the two cutting means 4. However, the blade 13 may be located in any suitable or appropriate position. The purpose of the blade 13 will be further described hereinafter.

Reference is now made to FIG. 2 of the accompanying drawings. FIG. 2 shows an arrangement according to one preferred form of the invention, which includes the cutting arrangement 1 as hereinbefore described. The cutting arrangement 1 may be attached to a stud axle 14 of a tractor 15. The cutting arrangement 1 preferably replaces a front wheel of the tractor 15, and is attached by the mounting or attachment means 3.

The arrangement may also be provided with a pilot wheel 16, which is attached to the substantially horizontal axle portion 17. Preferably, the pilot wheel 16 is located between the body of the tractor 15 and the cutting arrangement 1. The pilot wheel 16 may also include hydraulic operating means, generally indicated by the number 18 as shown in FIG. 2.

In one form of the invention there is also provided a tie rod 19, which allows the pilot wheel 16 to have a steering capability.

Figure 3:
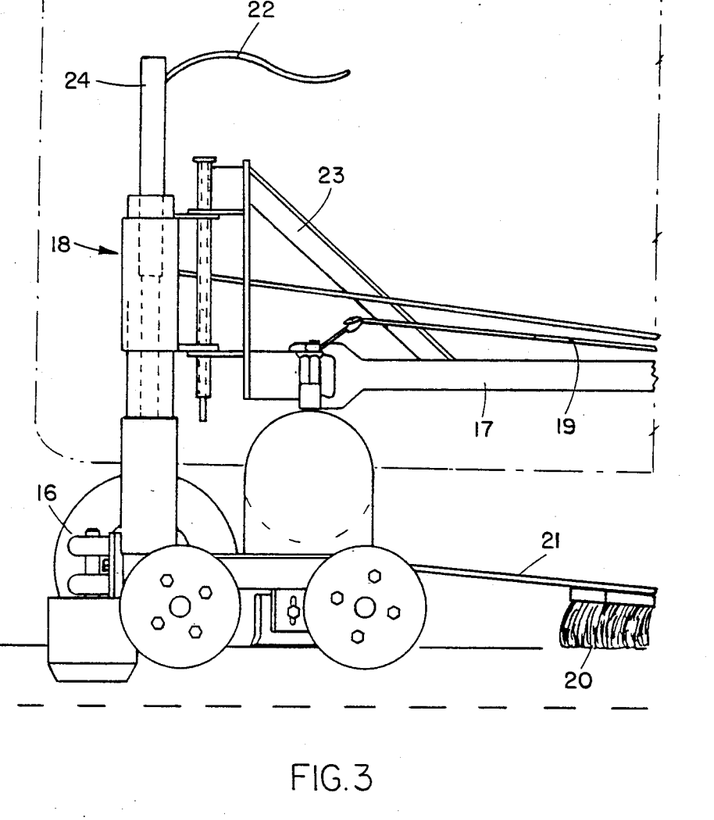
FIG. 3 shows a side view of the arrangement shown in FIG. 2.

As shown in FIG. 3, there may also be provided a broom 20, which is located behind the cutting and scraping means, and is attached by means of a mounting plate 21.

As also shown in FIG. 3, the hydraulic pilot wheel assembly includes a hydraulic hose 22, which connects the pilot wheel assembly to a control valve in the cab of the tractor or other vehicle.

The arrangement is also provided with an angle brace 23 which is attached to the tractor axle 17 and to the pilot wheel assembly 18.

In use, the cutting arrangement 1 is attached to the stud axle 14 of a tractor 15, or other suitable vehicle or propulsion means. Preferably, the cutting arrangement 1 is attached by means of the mounting or attachment means 3, wherein the end of the axle 14 is placed through the bore 6, in a manner such that studs provided on the axle 14 extend through the holes 7 provided on the collar 3a. The cutting arrangement 1 is thus secured to the stud axle 14.

The hydraulic pilot wheel 16 is fitted to the horizontal axle portion 17 of the tractor 15.

Generally, the axle is fitted with the pilot wheel 16 and the load is taken up by the pilot wheel hydraulics. After the pilot wheel has taken up the load, a front wheel of the tractor is replaced by the cutting arrangement 1. Preferably, the front left wheel of the tractor is replaced, however it is envisaged that the right front wheel may also be replaced without departing from the scope of the invention.

Pressure is then applied to the pilot wheel piston 24, through the hydraulic hose 22, and thus the tractor or vehicle 15 may be driven to, for example, the site where the cutting arrangement is to be used.

Once at the site, the arrangement can be aligned, as shown in FIG. 2, so that the cutting disc 9 will rotate adjacent one side of a curb. The jockey wheel 10 is located on the other side of the curb, and is adjustable to accommodate varying curb width and the like.

Once the cutting arrangement 1 is positioned in a suitable and appropriate manner, the pilot wheel may be withdrawn and the load will be taken up by the cutting means 4. In particular, the load is taken up by the wheels 8.

With the arrangement so positioned and located, the tractor 15 can then be driven along the curb, in the appropriate direction. Movement causes the wheels 8 to rotate, thus causing the cutting disc 9 to rotate.

This rotation of the cutting disc 9 causes any vegetation lying in the path of the cutting disc to be cut or served. Thus, the grass extending beyond the edge 25 of the curb will be cut.

The scraper blade 13 scrapes any cuttings form the vegetation into the channel 26. These cuttings may then be removed by any suitable means.

The broom 20, which may optionally be provided, serves to remove residual vegetation or cutting from the top of the curb into the channel.

Thus, vegetation such as grass and the like is cut and removed from the vicinity of a curb on the side of a road or footpath.

Once the cutting has finished, the pilot wheel 16 may be inserted, and pressure applied to the pilot wheel piston 24, in order that the pilot wheel 16 may again take up the load. Thus, the tractor or vehicle 15 may be driven to any required location, and also the cutting arrangement 1 may be removed.

In one preferred form of the invention, the jockey wheel 10 is adjustable within a suitable range, in order that varying widths of curb may be accommodated. The wheel is also adjustable in a vertical direction, in order to allow for varying curb heights, as there must be a minimal clearance between the bottom of the wheel 10 and the channel or passage.

During operation, the wheel 10 acts as a guide means, in order to keep the wheels 8 running along the top of the curb.

Figure 4:
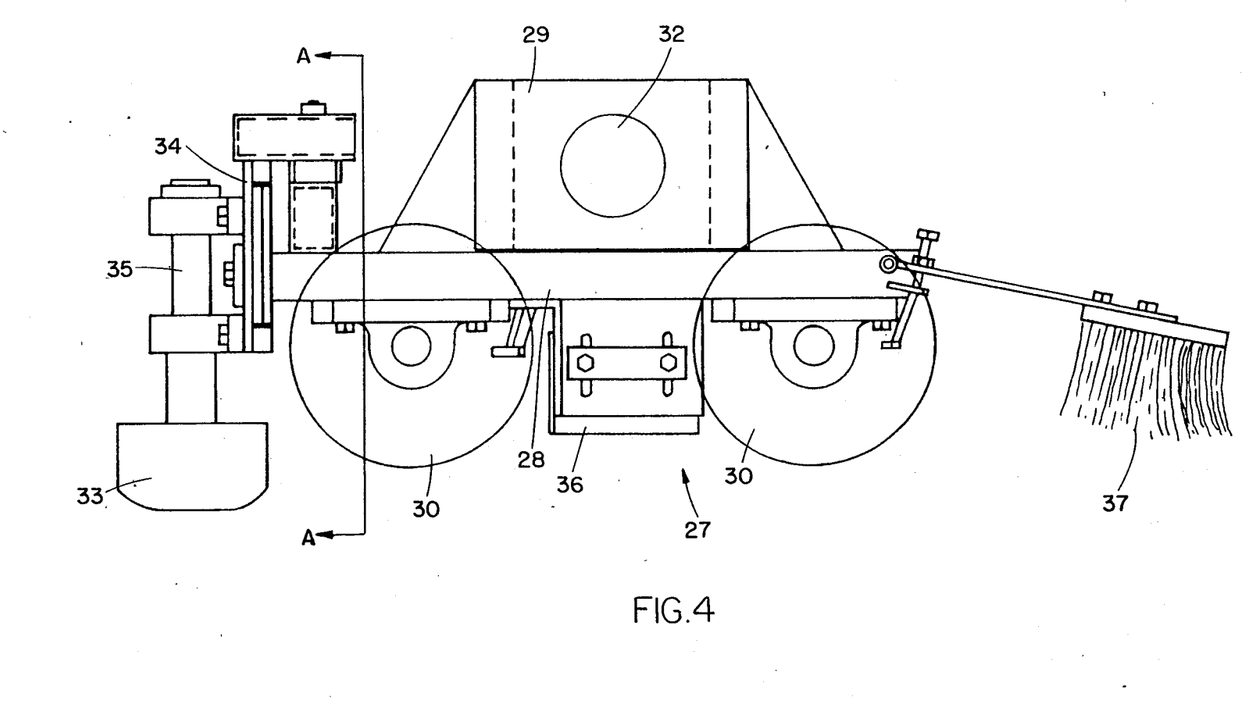
FIG. 4 shows a side view of a cutting arrangement according to a further aspect of the present invention.
Figure 5:
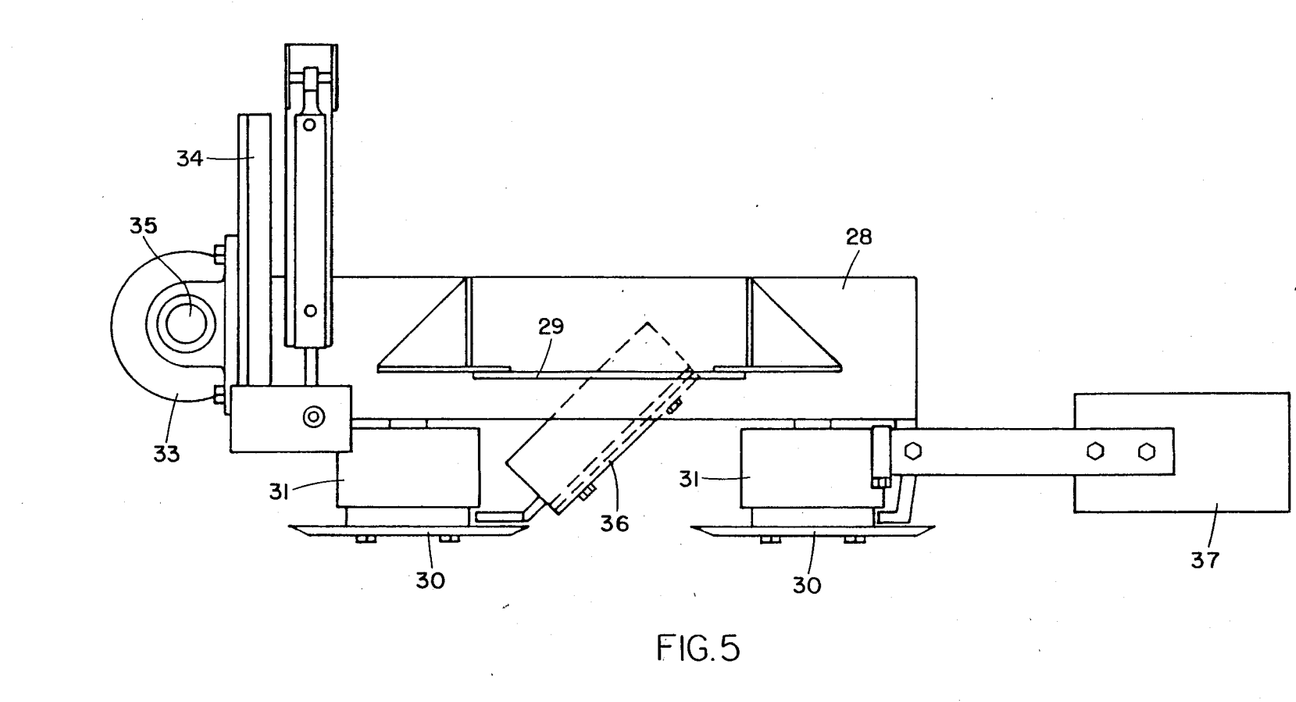
FIG. 5 shows a plan view of the arrangement shown in FIG. 4.
Figure 6:
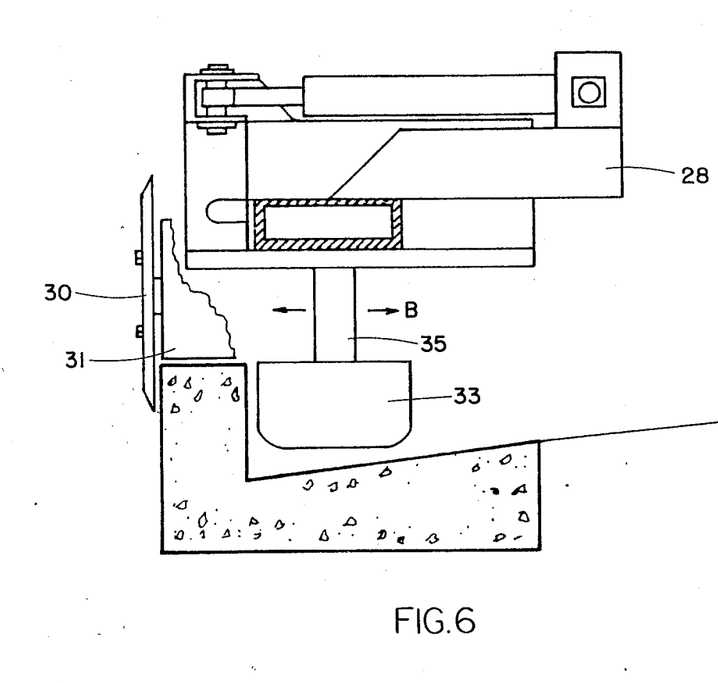
FIG. 6 shows a view of the arrangement shown in FIG. 4, through the line A—A.

Reference is now made to FIGS. 4 to 6 of the accompanying drawings. There is provided in one further preferred form of the invention a cutting arrangement 27, which is similar to the cutting arrangement 1, as shown in FIGS. 1 to 3. The arrangement 27 includes a suitable housing 28, attachment or mounting means 29, and cutting means in the form of two substantially circular cutting discs 30 and two freely rotatable wheels 31. As with the arrangement shown in FIGS. 1 to 3 of the accompanying drawings, the cutting discs 30 are free to rotate.

The attachment or mounting means 29 is provided with a substantially circular bore 32 extending therethrough, and again there may also be stud holes provided, through which studs on an axle of a tractor or other suitable vehicle may be located during use.

As with the arrangement shown in FIGS. 1 to 3, there is also provided guide means including a horizontally rotatable jockey wheel 33 mounted on a plate 34. The wheel 33 is rotatable about the axle 35.

There may also be provided a scraper blade 36 and a broom 37.

Although not shown in the accompanying drawings, the arrangement 27 is adapted to be attached to a tractor or other suitable or appropriate vehicle or machine, in a manner similar to that described with reference to FIGS. 1 to 3.

The arrangement 27 is substantially more robust than the arrangement 1, but otherwise the arrangements are similar in construction and form.

Referring now to FIG. 6, means are provided by which the wheel 33 may be adjusted, in the direction indicated by the arrows B. This allows for the position of the arrangement to be varied, according to curb profile and width.

Figure 7:
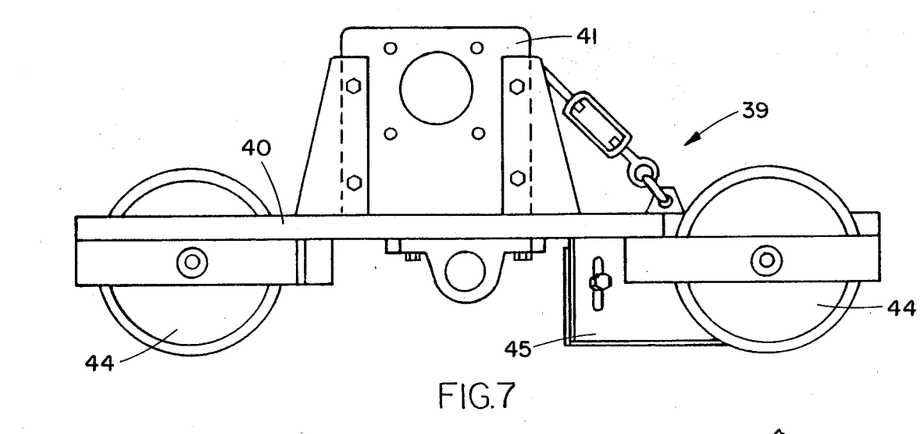
FIG. 7 shows a side view of an arrangement according to a still further aspect of the present invention.
Figure 8:
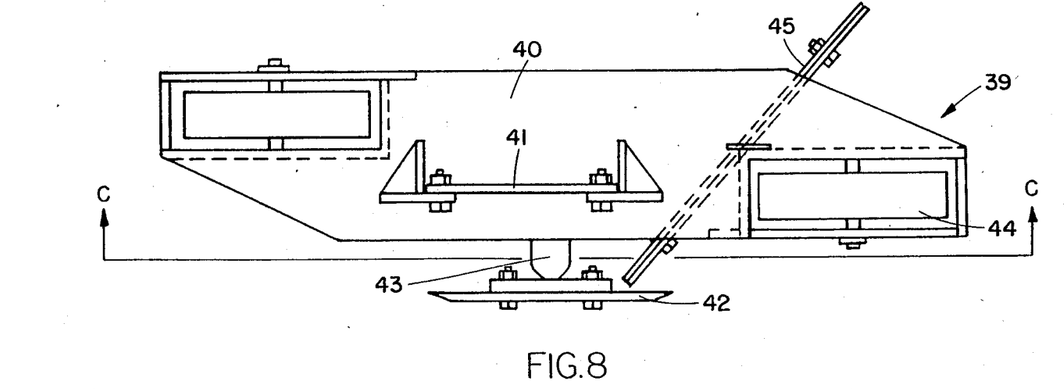
FIG. 8 shows a plan view of the arrangement shown in FIG. 7.

Reference is now made to FIGS. 7 and 8 of the accompanying drawings. There is provided in a further preferred form of the invention a cutting arrangement 39. The arrangement 39 is similar to that described previously, and includes a housing 40, attachment or mounting means 41, cutting means including a cutting disc 42 (not shown in FIG. 7 for clarity) and wheel attachment 43. There are also provided two jockey wheels 44.

The arrangement 39 is attached or mounted to a tractor or other suitable or appropriate vehicle in a manner as described above, with reference to FIGS. 1 to 3, and operates in a substantially similar manner. However, the arrangement is adapted for use in cutting footpath edges, rather than curbs. Thus, the two wheels 44 are provided to guide the arrangement along the edge of a footpath. The wheels 44 maintain the cutting disc 42 at the correct height, in order that the vegetation is cut adequately.

There may also be provided other features, such as the scraper 45.

Figure 9:
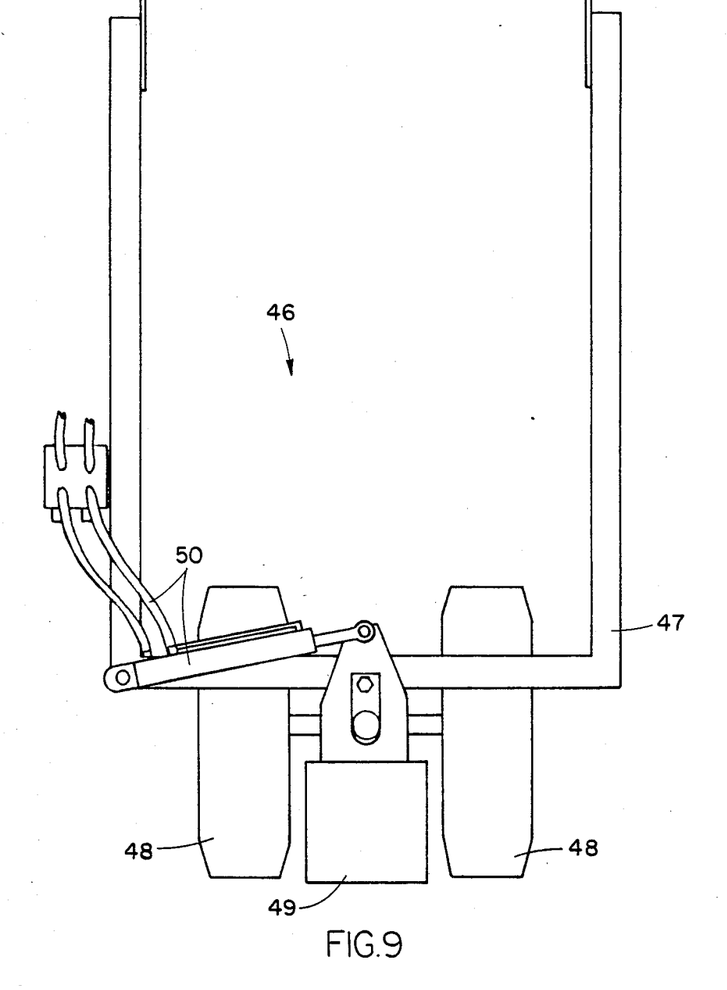
FIG. 9 shows a plan view of a wheel assembly according to a still further aspect of the present invention.
Figure 10:
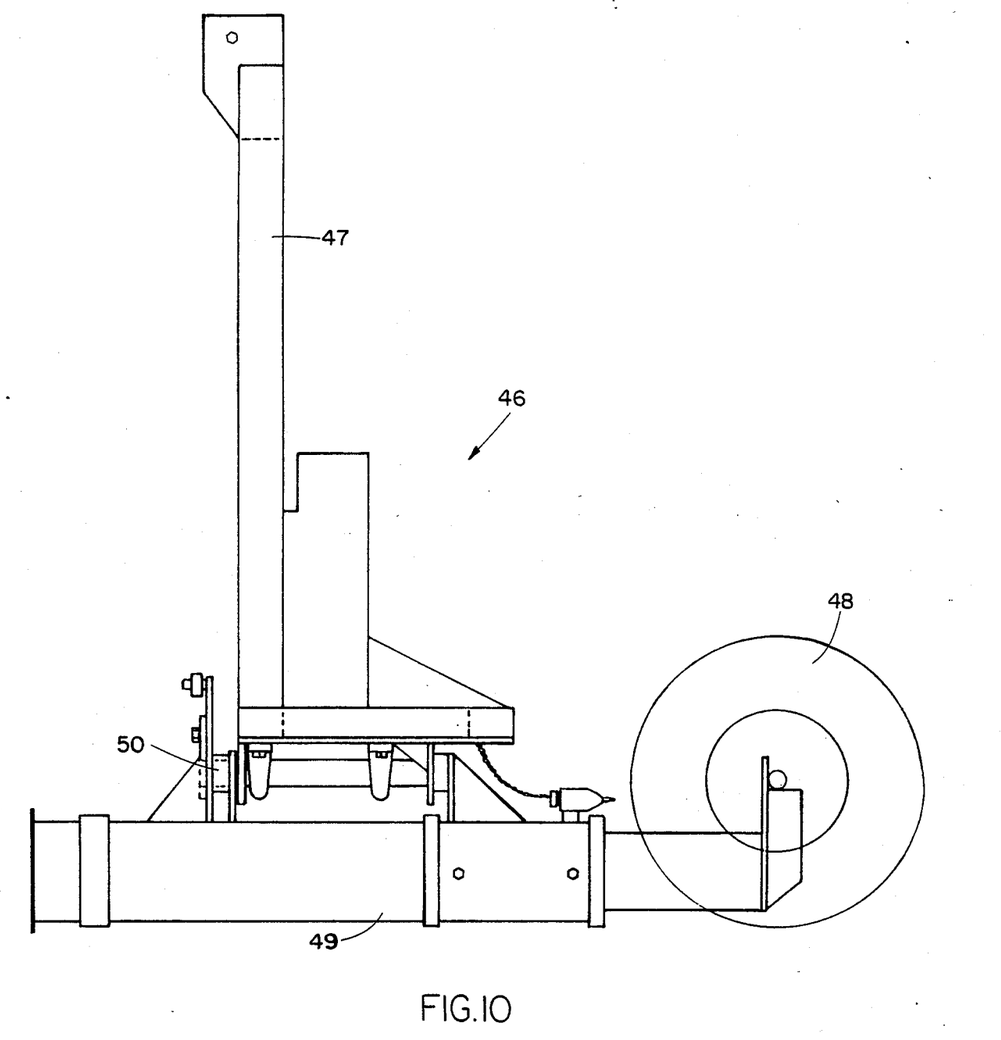
FIG. 10 shows a side view of the assembly shown in FIG. 9.

Reference is now made to FIGS. 9 and 10 of the accompanying drawings. In the description given above with reference to FIGS. 2 to 3, a pilot wheel 16 is provided, the wheel 16 being attached to a substantially horizontal axle portion 17. The wheel 16 takes up the load when a wheel of the tractor or other vehicle is to be removed, so that a cutting arrangement according to the present invention may be mounted.

In a further preferred form of the invention, a wheel assembly 46, as shown in FIGS. 9 and 10, may be provided, instead of the pilot wheel 16. The wheel assembly 46 is attachable to the front of a tractor or other suitable vehicle. For example, the wheel assembly 46 is adapted in one preferred form of the invention to be attachable to Pearson loader bracket. It should be appreciated, however, that the wheel assembly 46 may be attachable to any suitable or appropriate brackets or mountings.

The wheel assembly 46 comprises a housing 47, guide wheels 48, a suitable axle and housing arrangement 49, and means to enable to the wheel assembly 46 to take the load of the tractor or other vehicle, when required. For example, hydraulic arrangement 50 is provided in one preferred form of the invention.

The load can thus be taken up by the wheel assembly 46 and wheel assembly hydraulics 50, after which the front wheel of the tractor is replaced by a suitable and appropriate cutting means according to the present invention.

Although the accompanying drawings show arrangements generally adapted to be placed on the left front axle, it should be appreciated that such arrangements can also be placed on the right hand side of the vehicle.

Appropriate pressure may be applied through the hoses of the arrangement 50, in order that the tractor or other vehicle may be driven to an appropriate location. Thereafter, the load may be taken up by the cutting assembly, as described hereinabove. Alternatively, with the arrangement as shown in FIGS. 7 and 8 of the accompanying drawings, the wheel assembly 46 may maintain the load during operation, in order that vegetation on footpath edges may be cut.

In one preferred form of the invention, the wheel assembly 46 also has a steering capability, as is the case with the pilot wheel 16.

The arrangement may be formed by any suitable technique, and from any suitable materials, as would be obvious to the skilled addressee. For example, the various components of the arrangement 1 may be manufactured of suitable metallic materials.

Although the invention has been described with reference to various preferred embodiments thereof, it should be appreciated that modifications and variations may be made thereto, without departing from the scope of the invention. For example, it is envisaged that the cutting arrangement 1 may be attached to a suitable vehicle or propulsion means by any suitable method. For example, a clip-on arrangement may be used to advantage. It is also envisaged that a plurality of cutting means may be provided. There may also be provided only one cutting means.

Thus, by this invention there is provided a cutting arrangement suitable for cutting or trimming vegetation such as grass and the like which grows adjacent curbs along the side of roads and footpaths, which is simple and convenient to operate.

Although this invention has been described by way of example, and with particular reference to these embodiments thereof, it should be understood that modifications may be made to this invention without departing from the scope thereof, as defined in the appended claims.

We claim:

1. A cutting assembly for cutting vegetation along a curb, releasably attachable to propulsion means, said cutting assembly comprising a housing, said housing having a top surface, a front surface and side surfaces, attaching means for said cutting assembly on the top surface of said housing and extending outwardly therefrom, at least one cutting means attached to one side of the housing, said cutting means comprising a generally vertical rotatable cutting blade spaced from the side of the housing, guide means adjustably locatable in relation to the housing and horizontally rotatable, whereby when said cutting assembly is attached to said propulsion means, the guide means extends to contact one side of a curb to position the vertical cutting blade on the other side of said curb to trim vegetation alongside on said other side of said curb.

2. The cutting assembly according to claim 1 which comprises two guide means.

3. A cutting assembly for cutting vegetation along a curb, said assembly being releasably attachable to propulsion means, said assembly comprising a housing, said housing having a top surface, a front surface and side surfaces, attaching means for said assembly extending outwardly from the top surface of said housing, said propulsion means having an axle, said attaching means being attachable to said axle, at least one cutting means attached to a side of said housing, said cutting means having a freely rotatable wheel with a generally vertical cutting disc releasably attachable to an outer end of said wheel in spaced relationship with the side of the housing, and guide means adjustably locatable in relation to the housing whereby said guide means are rotatable horizontally and in use, the guide means contacts one side of a curb to position the vertical cutting disc to trim vegetation on the other side of the curb.

4. The assembly according to claim 3 wherein said propulsion means is a tractor which ordinarily has a front wheel, said assembly comprises a pilot wheel about or adjacent said axle, said pilot wheel being capable of bearing the load of said tractor, and said cutting assembly replaces said front wheel.

5. The cutting assembly according to claim 3 wherein said propulsion means ordinarily has a front wheel, said cutting assembly comprises a wheel assembly attachable to the front of said propulsion means; said wheel assembly being capable of bearing the load of said propulsion means whereby said front wheel of said propulsion means is removed.

6. A method of cutting vegetation about or adjacent a curb, which comprises the steps of attaching to an anxle of a vehicle a cutting assembly, said cutting assembly comprising a housing, said housing having a top surface, a front surface and side surfaces, attaching means for said assembly located on the top surface of said housing and extending outwardly therefrom, cutting means attached to a side of said housing and comprising a rotatable generally vertical cutting blade spaced from the side of the housing, said guide means being horizontally rotatable and adjustably locatable in relation to the housing whereby when the cutting assembly is attached to the vehicle, the guide means extends to contact one side of a curb to position the vertical cutting blade on the other side of the curb to trim any vegetation alongside the other side of the curb.

7. A method of cutting vegetation alongside or adjacent a curb which comprises the steps of actuating a pilot wheel or wheel assembly to lift a vehicle, said vehicle ordinarily having wheels and an axle, removing one wheel of said vehicle, attaching to said axle a cutting assembly which comprises a housing, said housing having a top surface, a front surface and side surfaces, attaching means for said cutting assembly on the top surface of said housing and extending outwardly therefrom, at least one cutting means attached to one side of the housing, said cutting means comprising a generally vertical rotatable cutting blade spaced from the side of the housing, guide means adjustably locatable in relation to the housing and horizontally rotatable, then positioning said cutting means adjacent one side of said curb, positioning said guide means adjacent on opposite side of said curb, and then moving said cutting assembly relative to said curb and vegetation.

8. A method of cutting vegetation alongside or adjacent a curb which comprises the steps of actuating a pilot wheel or wheel assembly to lift a vehicle, said vehicle ordinarily having wheels and an axle, removing one wheel of said vehicle, attaching to said axle a cutting assembly which comprises a housing, said housing having a top surface, a front surface and side surfaces, attaching means for said assembly extending outwardly from the top surface of said housing, said propulsion means having an axle, said attaching means being attachable to said axle, at least one cutting means attached to a side of said housing, said cutting means having a freely rotatable wheel with a generally vertical cutting disc releasably attachable to an outer end of said wheel in spaced relationship with the side of the housing, and guide means adjustably locatable in relation to the housing, then positioning said cutting means adjacent an opposite side of said curb, and then moving said cutting assembly relative to said curb and vegetation.

* * * * *